(12) United States Patent
Kudo

(10) Patent No.: US 8,896,893 B2
(45) Date of Patent: Nov. 25, 2014

(54) LIGHT SCANNING APPARATUS AND IMAGE FORMING APPARATUS USING THE SAME

(71) Applicant: Canon Kabushiki Kaisha, Tokyo (JP)

(72) Inventor: Genichiro Kudo, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/188,914

(22) Filed: Feb. 25, 2014

(65) Prior Publication Data

US 2014/0240795 A1 Aug. 28, 2014

(30) Foreign Application Priority Data

Feb. 28, 2013 (JP) ................................. 2013-038626

(51) Int. Cl.
*H04N 1/04* (2006.01)
*H04N 1/028* (2006.01)
*H04N 1/46* (2006.01)

(52) U.S. Cl.
CPC ................................. *H04N 1/02815* (2013.01)
USPC ............................ 358/475; 358/474; 358/505

(58) Field of Classification Search
USPC ............ 358/1.1, 1.4, 1.5, 1.6, 1.9, 1.11–1.18, 358/474, 475, 494, 495, 505
See application file for complete search history.

(56) References Cited

FOREIGN PATENT DOCUMENTS

| JP | 05-328045 A | 12/1993 |
|----|-------------|---------|
| JP | 07-244248 A | 9/1995 |
| JP | 2011016296 A | 1/2011 |

*Primary Examiner* — Thierry L Pham
(74) *Attorney, Agent, or Firm* — Rossi, Kimms & McDowell LLP

(57) ABSTRACT

The object of the present invention is to provide a light scanning apparatus of a simple arrangement which can reduce print misregistration of respective beams in a main scanning direction in an image region even when an inexpensive imaging optical unit which forms a spot image on the image region of a surface to be scanned, and can form a high-resolution image, and an image forming apparatus using the same.

7 Claims, 9 Drawing Sheets

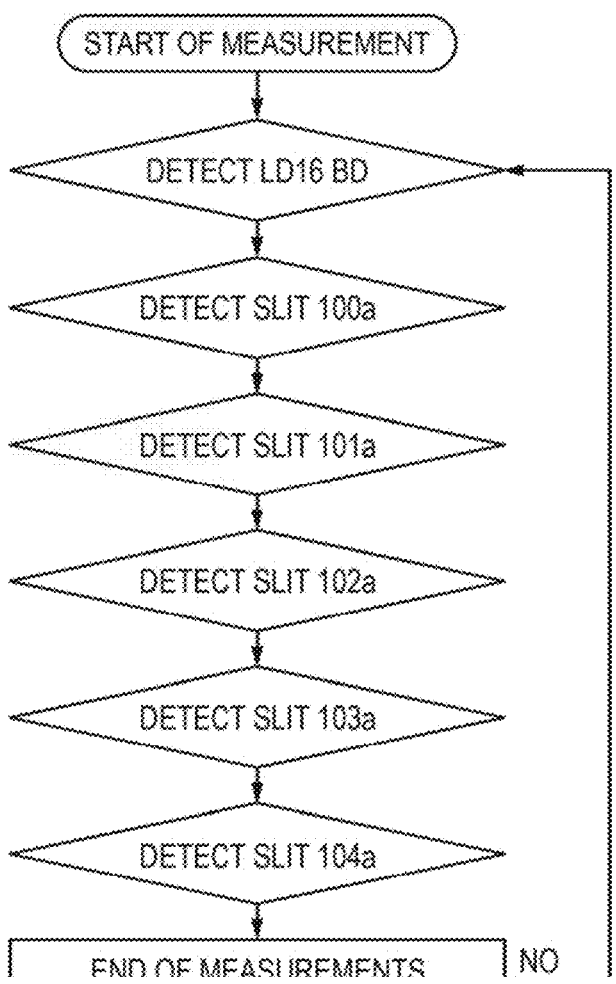

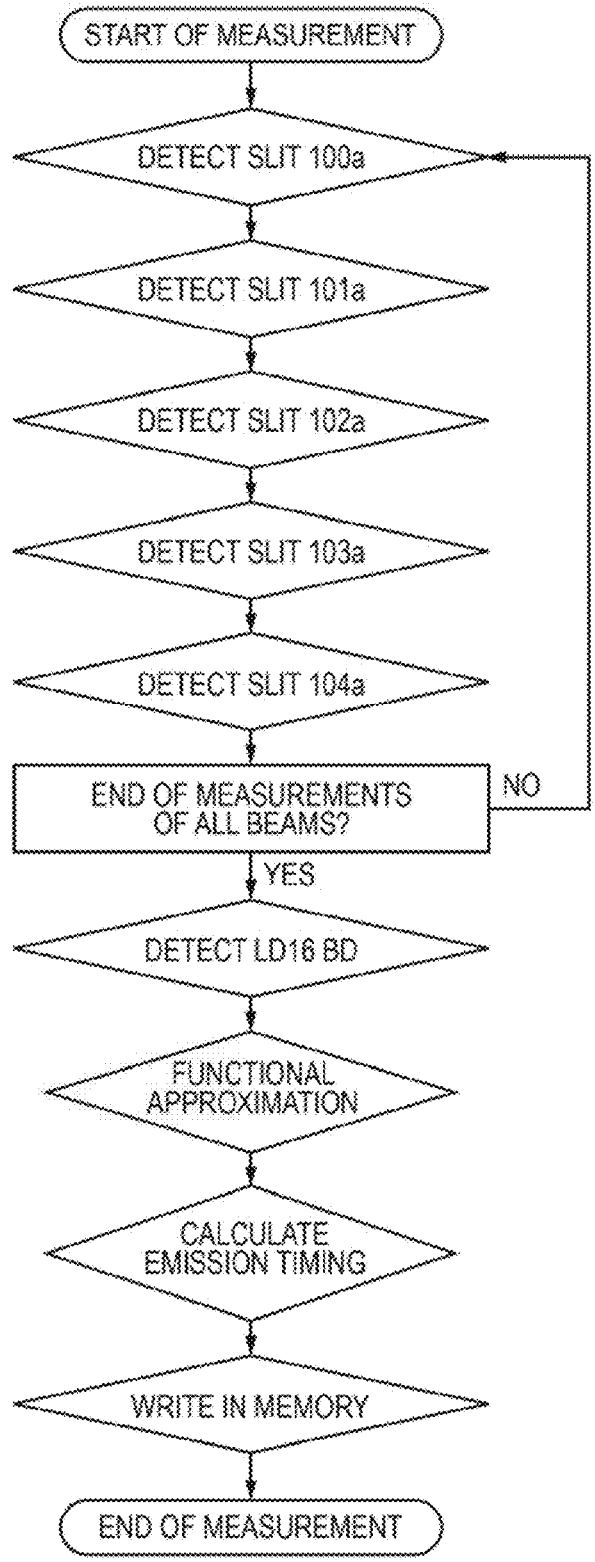

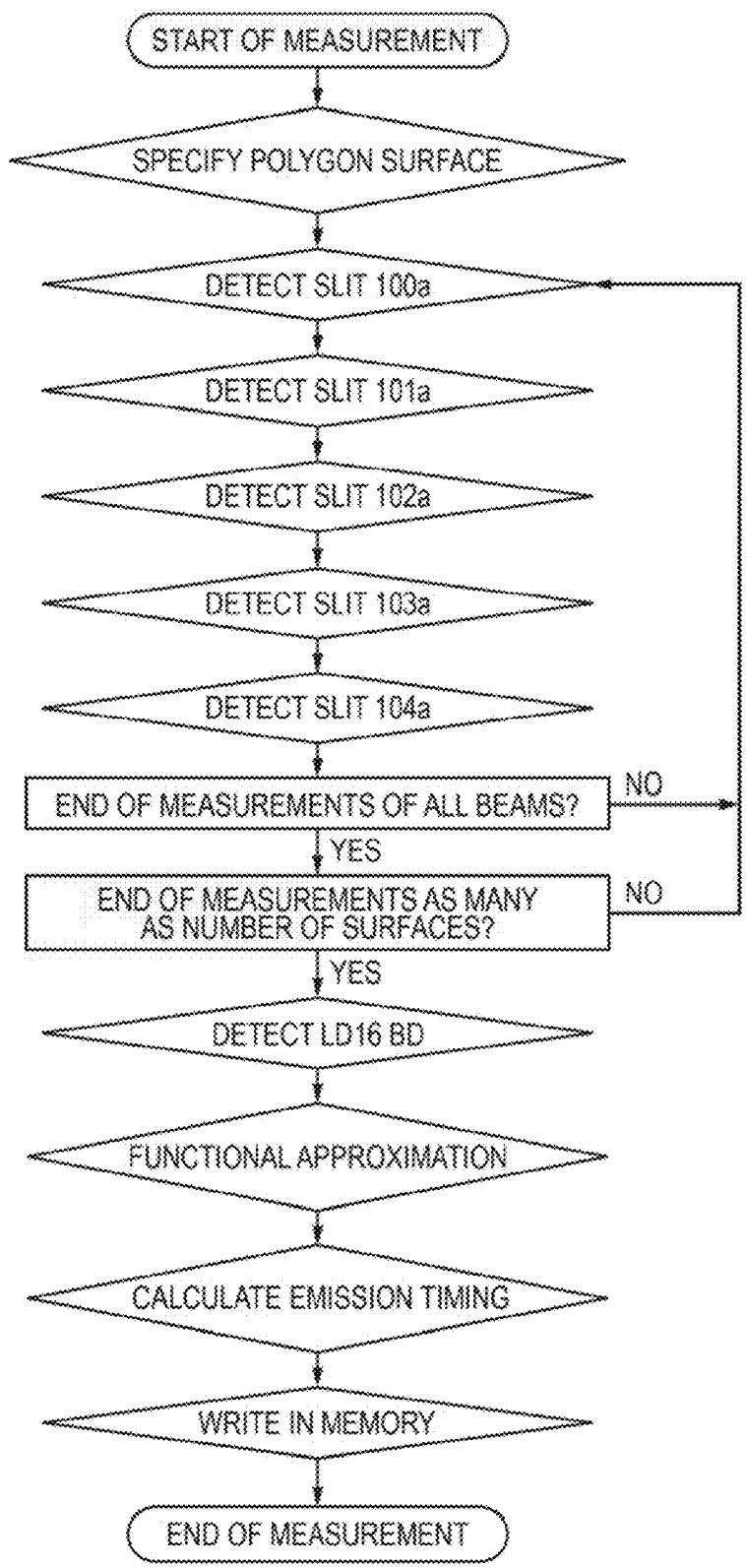

LIGHT SCANNING APPARATUS AND IMAGE FORMING APPARATUS USING THE SAME

BACKGROUND OF THE INVENTION

1. Field of the Invention

The present invention relates to a light scanning apparatus and an image forming apparatus using the same and, more particularly, to a light scanning apparatus suitably used for a laser beam printer, digital copying machine, and multi-function printer (MFP) having an electrophotography process.

2. Description of the Related Art

Conventionally, as a light scanning apparatus using a light source unit having a plurality of light-emitting units (light-emitting points) (multi-beam light source), a light scanning apparatus, which forms spots of a plurality of light beams emitted by the multi-beam light source onto a surface as a surface to be scanned of a photosensitive drum (photosensitive body) using a scanning lens (f-θ lens) has been proposed. Such light scanning apparatus performs electrical correction so as to cause image lengths to match even when wavelength differences are generated between the plurality of beams. Japanese Patent Application Laid-Open No. H05-328045 discloses a technique related to an image forming apparatus including a unit for measuring image lengths (total magnifications) of respective beams of the plurality of beams by arranging sensors at two end portions of an image in a main scanning direction, and a unit for correcting image lengths according to the measured lengths.

In this case, when a manufacturing error of the scanning lens (f-θ lens) has occurred, a focus position in the main scanning direction changes according to a position in the main scanning direction in an image region (a curvature of field in the main scanning direction), thus causing print misregistration (partial magnification displacement) of respective beams in the image region in the main scanning direction.

However, Japanese Patent Application Laid-Open No. H05-328045 can correct image lengths (total magnifications) of all the beams, but it cannot correct positions (partial magnifications) of the plurality of beams in the image region in the main scanning direction. This is because the sensors at the two end portions of an image cannot measure a position in the main scanning direction in the image region.

Thus, in the light scanning apparatus using the multi-beam light source, print misregistration (partial magnification displacement) in the main scanning direction occur for respective beams in the image region due to the curvature of field in the main scanning direction of the f-θ lens, thus causing image errors such as moiré and jitter. Also, in a color image forming apparatus, which forms an image by superposing a plurality of different images, print misregistration occur for respective colors, that is, so-called color misregistration occurs.

SUMMARY OF THE INVENTION

In order to achieve the above object, a light scanning apparatus according to the present invention comprises: a deflection unit configured to deflect a first beam and a second beam from a light source unit, which includes a first light-emitting point which intermittently emits the first beam and a second light-emitting point which intermittently emits the second beam, along a main scanning direction; and an imaging optical system configured to focus the first beam and the second beam output from the deflection unit on a surface to be scanned so as to form a plurality of spots using the first beam and a plurality of spots using the second beam, wherein letting a first spot and a second spot be two neighboring spots of the plurality of spots formed by the first beam, and a third spot and a fourth spot be two spots of the plurality of spots formed by the second beam having the same positions as the first spot and the second spot in the main scanning direction, a time difference when the first light-emitting point emits the beam so as to form the first spot and the second spot and a time difference when the second light-emitting point emits the beam so as to form the third spot and the fourth spot are different from each other.

Furthermore, an image forming apparatus according to the present invention comprises the aforementioned light scanning apparatus, a photosensitive member arranged on the surface to be scanned, a developing unit configured to develop an electrostatic latent image formed on the photosensitive member by a light beam scanned by the light scanning apparatus as a toner image, a transferring unit configured to transfer the developed toner image onto a transfer material, and a fixing unit configured to fix the transferred toner image onto the transfer material.

Also, an image forming apparatus according to another aspect of the present invention comprises the aforementioned light scanning apparatus, and a printer controller configured to convert code data input from an external apparatus into an image signal and to input the image signal to the light scanning apparatus.

Moreover, an image forming apparatus using the aforementioned light scanning apparatus also configures another aspect of the present invention.

Further features of the present invention will become apparent from the following description of exemplary embodiments with reference to the attached drawings.

BRIEF DESCRIPTION OF THE DRAWINGS

FIG. 7 is a flowchart showing decision of a correction amount according to the first embodiment of the present invention.

FIG. 8 is a flowchart showing decision of a correction amount according to the second embodiment of the present invention.

FIG. 9 is a flowchart showing decision of a correction amount according to the third embodiment of the present invention.

DESCRIPTION OF THE EMBODIMENTS

Figure 1A:
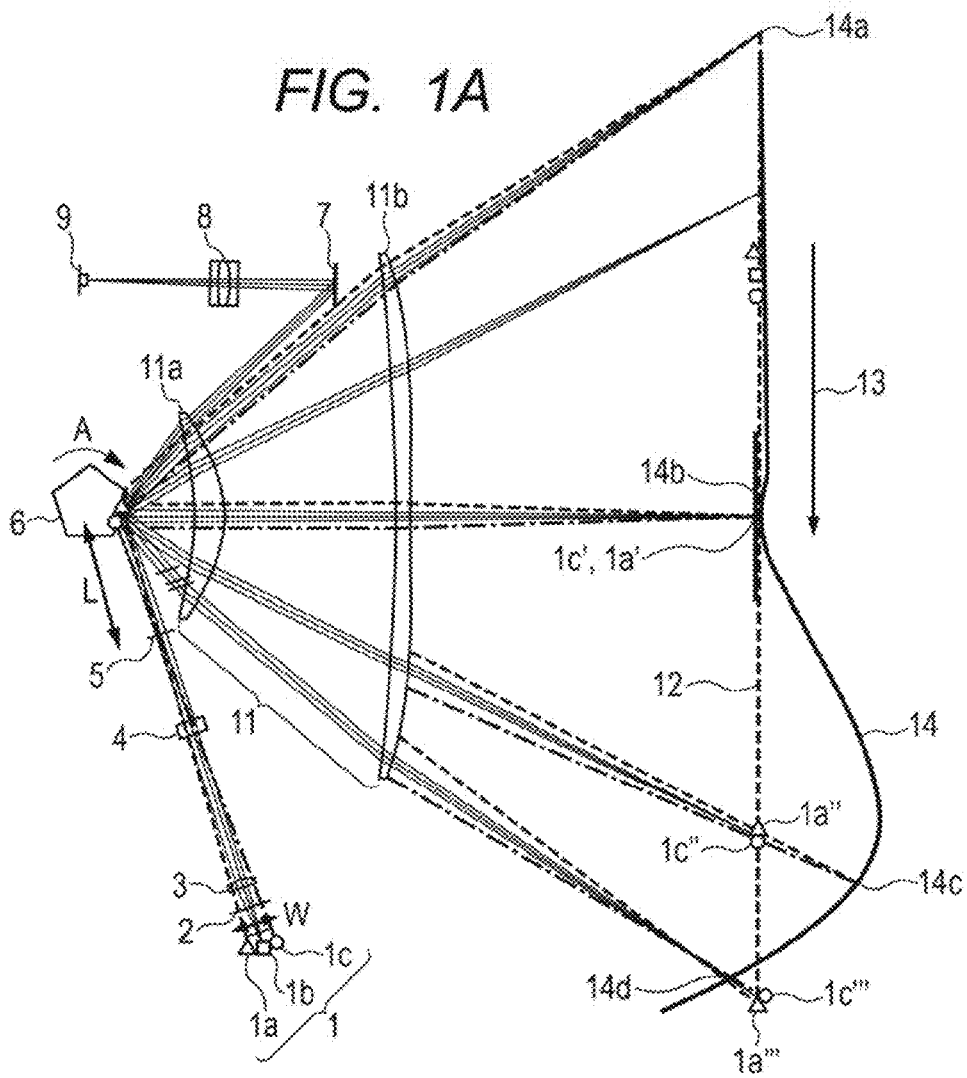
FIG. 1A is a schematic view showing a defocus of a light scanning apparatus in a main scanning section according to the first embodiment of the present invention.

The object of the present invention is to provide a light scanning apparatus of a simple arrangement which can reduce print misregistration of respective beams in a main scanning direction in an image region even when an inexpensive imaging optical unit which forms a spot image on the image region of a surface to be scanned, and can form a high-resolution image, and an image forming apparatus using the same.

Preferred embodiments of the present invention will now be described in detail in accordance with the accompanying drawings. In the following description, a main scanning direction is a direction perpendicular to a rotation axis of a rotary polygon mirror and an optical axis of an imaging optical system (a direction in which a light beam is reflected and deflected (deflected and scanned) by the rotary polygon mirror), and a sub-scanning direction is a direction parallel to the rotation axis of the rotary polygon mirror. Also, a main scanning section is a plane including the main scanning direction and the optical axis of the imaging optical system, and a sub-scanning section is a section which includes the optical axis of the imaging optical system and is perpendicular to the main scanning section.

In a light scanning apparatus of the present invention, a light source unit includes a first light-emitting point which intermittently emits a first beam, and a second light-emitting point which intermittently emits a second beam. A deflection unit deflects the first and second beams from the aforementioned light source unit along the main scanning direction, and an imaging optical system focuses the first and second beams emanating from this deflection unit on a surface to be scanned to form, on the surface to be scanned, a plurality of spots using the first beam and a plurality of spots using the second beam. Under such arrangement, letting first and second spots be two neighboring spots of the plurality of spots formed by the first beam, and third and fourth spots be two spots of the plurality of spots formed by the second beam which have the same positions as the first and second spots in the main scanning direction, a time difference when the first light-emitting point emits the beam so as to form the first and second spots and a time difference when the second light-emitting point emits the beam so as to form the third and fourth spots are configured to be different from each other.

Note that the two neighboring spots are two spots which are successively formed by the beam intermittently emitted by the single light-emitting point on a scan line (surface to be scanned) drawn to be parallel to the main scanning direction by the beam emitted from that light-emitting point. These two spots are two neighboring spots of a plurality of spots formed when the single light-emitting point emits a beam at different timings. These two spots need only have their centers at different positions even when they (outer shapes of the spots) overlap each other. That is, these two spots may be those having neighboring spot center positions of a plurality of spots having different spot center positions.

The two spots located at the same position in the main scanning direction (a combination of the first and third spots or the second and fourth spots) need not always have completely the same position, and may be spots which "have nearly the same position in the main scan direction" or "have closest positions in the main scanning direction" or "overlap in the sub-scanning direction (when viewed from the sub-scanning direction)".

Figure 1B:
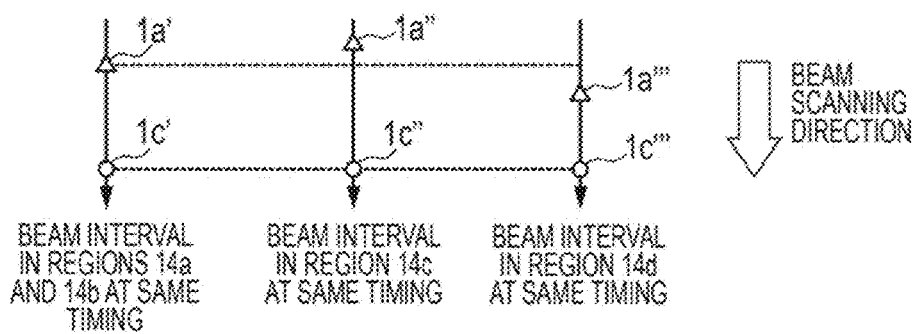
FIG. 1B is an explanatory view of beam intervals at the same time.

Note that the aforementioned first, second, third, and fourth spots correspond to $1a'$, $1c'$, $1a''$, and $1c''$ in FIG. 1B in an embodiment to be described below.

First Embodiment

Image Forming Apparatus

Figure 10:
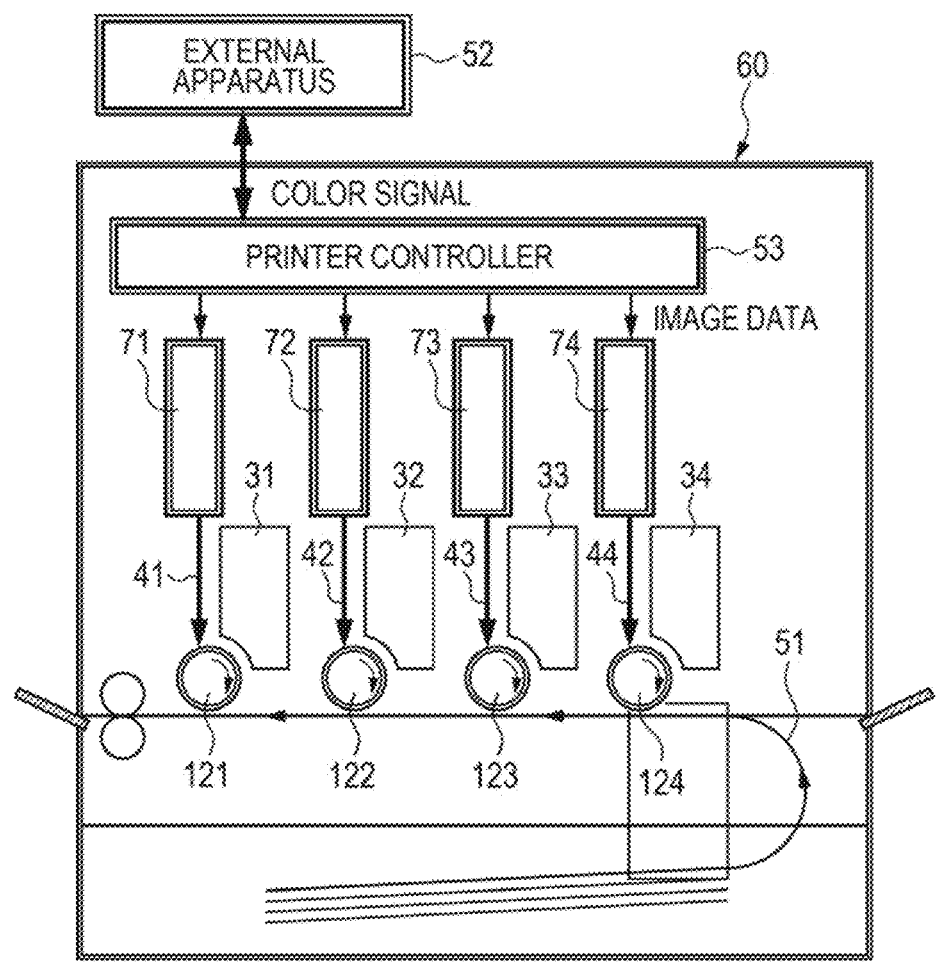
FIG. 10 is a schematic sectional view of principal part of a color image forming apparatus which mounts a light scanning apparatus according to an embodiment of the present invention.

FIG. 10 is a schematic view showing a color image forming apparatus which mounts a light scanning apparatus according to an embodiment of the present invention, and shows a principal part section in the sub-scanning direction. In FIG. 10, a color image forming apparatus 60 includes light scanning apparatuses 71, 72, 73, and 74 (to be described in detail later), photosensitive drums 121, 122, 123, and 124 as image carriers (photosensitive bodys), developing units 31, 32, 33, and 34, and a conveying belt 51.

To the color image forming apparatus 60 of this embodiment, R (Red), G (Green), and B (Blue) color signals are input from an external apparatus 52 such as a personal computer. Input code data of these color signals are converted into Y (Yellow), M (Magenta), C (Cyan), and B (Black) image data (dot data) by a printer controller 53 in the apparatus. These image data are input to the light scanning apparatuses 71, 72, 73, and 74.

Then, from the light scanning apparatuses 71, 72, 73, and 74, light beams 41, 42, 43, and 44 modulated according to respective image data are emitted, and photosensitive surfaces of the photosensitive drums 121, 122, 123, and 124 are scanned by these light beams in the main scanning direction.

In the color image forming apparatuses 60 of this embodiment, four beams are scanned by the light scanning apparatuses 71, 72, 73, and 74, and respective beams correspond to Y (Yellow), M (Magenta), C (Cyan), and B (Black) colors. Then, on respective drum surfaces of the photosensitive drums 121, 122, 123, and 124, which are juxtaposed, toner images according to latent images corresponding to image signals (image information) are respectively formed by the developing units 31, 32, 33, and 34.

As described above, according to this embodiment, the respective light scanning apparatuses and developing units respectively print toner images according to electrostatic latent images of respective colors on the corresponding photosensitive drum surfaces using light beams based on respective image data at high speed. After that, by a transferring unit which transfers the toner images onto a recording medium as a medium to be transferred, and a fixing unit which fixes the toner image on the medium to be transferred, one full-color image is formed by multiple-transferring the toner image onto the recording medium.

As the external apparatus 52, for example, a color image reading apparatus including a CCD sensor may be used. In this case, this color image reading apparatus and the color image forming apparatus 60 configure a color digital copying machine.

Light Scanning Apparatus

Figure 1C:
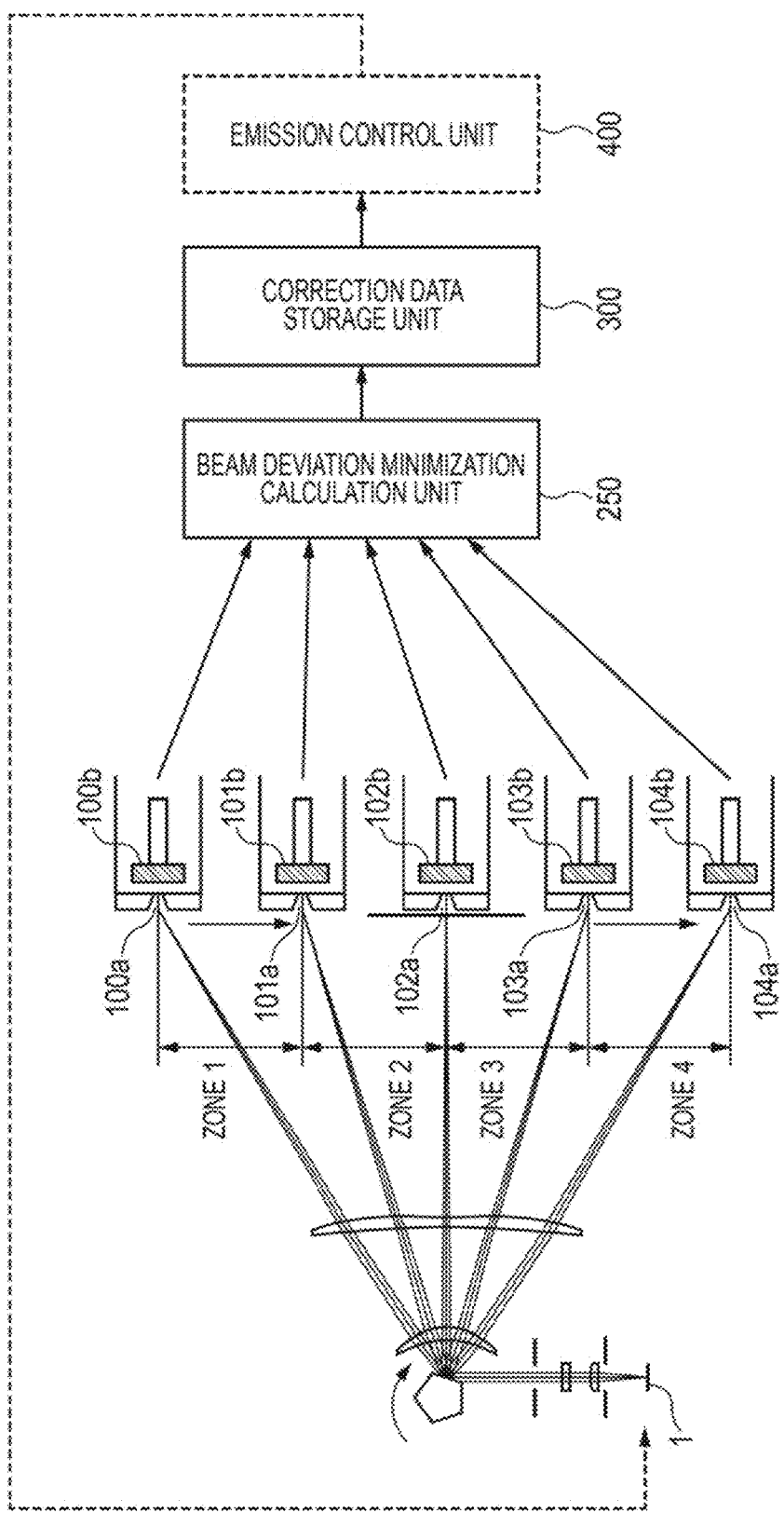
FIG. 1C is a block diagram showing an entire system for correcting emission timings by measuring beam interval deviations.
Figure 2:
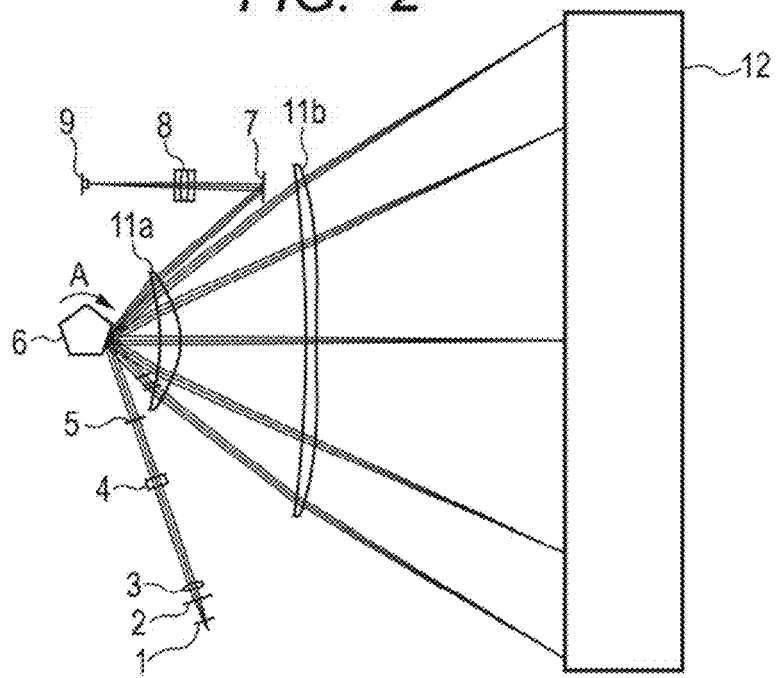
FIG. 2 is a main scanning sectional view of the light scanning apparatus according to the first embodiment of the present invention.
Figure 3:
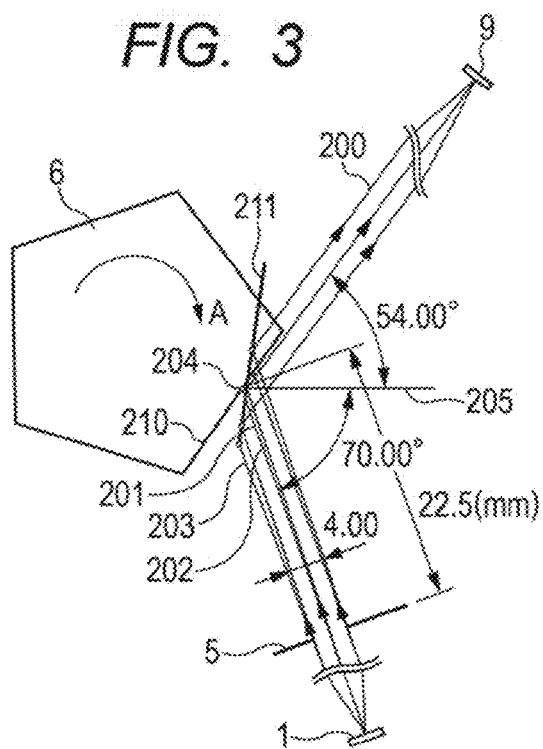
FIG. 3 is an enlarged view of the main scanning section in the vicinity of a deflection surface of the light scanning apparatus according to the first embodiment of the present invention.

A light scanning apparatus according to the first embodiment of the present invention will be described below with reference to the drawings. FIG. 1A is a schematic view showing a defocus of the light scanning apparatus in the main scanning section according to the first embodiment of the present invention, FIG. 1B is an explanatory view of beam intervals at the same time, and FIG. 1C is a schematic view showing an overall system for correcting emission timings by measuring beam interval deviations. Also, FIG. 2 is a main scanning sectional view of the light scanning apparatus according to this embodiment, and FIG. 3 is an enlarged view of the main scanning section in the vicinity of a deflection surface.

Figure 5:
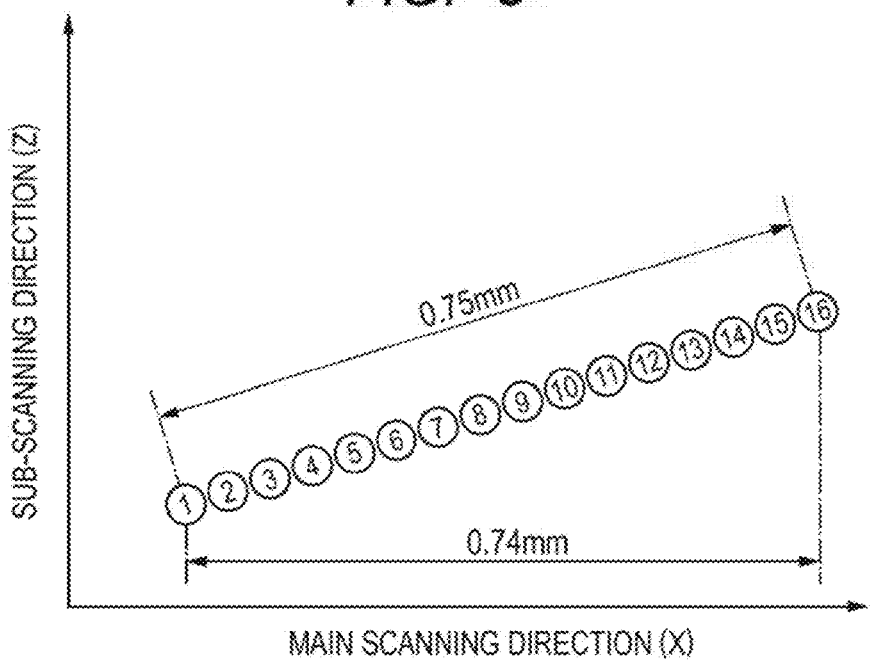
FIG. 5 is a schematic view showing a light source of the light scanning apparatus according to the first embodiment of the present invention.

In these figures, a light source unit 1 intermittently emits a plurality of beams at the same time, and includes a semiconductor laser having 16 light-emitting points (LD1 to LD16), as shown in FIG. 5. A rectangular aperture stop 2 restricts a light beam width only in the sub-scanning direction of a light beam emitted from the light source unit 1. A collimator lens 3 converts a light beam passed through the aperture stop 2 into a nearly collimated beam in both the main scanning direction and sub-scanning direction. A cylindrical lens 4 has a predetermined refractive power only in the sub-scanning direction. A rectangular aperture stop 5 restricts a light beam width in the main scanning direction, and has an aperture width broader than the beam width in the sub-scanning direction.

Note that each of elements such as the aperture stops 2 and 5, collimator lens 3, and cylindrical lens 4 configures one element of an incident optical unit.

A light deflector 6 as a deflection element includes, for example, a polygon mirror (rotary polygon mirror), and is rotated by a driving unit (not shown) such as a motor in a direction of an arrow A in FIG. 1A at a constant speed. A scanning lens (f-θ lens) 11 has f-θ characteristics, and focuses a light beam as a spot on an image region of a surface to be scanned. Note that this spot is desirably a focal point located at a position conjugate with a light-emitting point generated by the light source unit, but may be located at a position corresponding to a locally small beam waist.

The scanning lens 11 includes lenses 11a and 11b, and sets a nearly conjugate relationship between a deflection surface of the light deflector 6 or its adjacent position and a photosensitive drum surface 12 as a surface to be scanned or its adjacent position on the sub-scanning section. Thus, the scanning lens 11 has an optical face tangle error correction function of the light deflector.

In this embodiment, a size of a light beam section of a light beam, which is optically modulated by and emitted from the light source unit 1 according to image information, is restricted by the aperture stops 2 and 5, and the light beam is converted by the collimator lens 3 into nearly collimated light, which then enters the cylindrical lens 4. The aperture stop 5 is a stop which restricts the light beam width in the main scanning direction, and restricts the widths of 16 light beams from the light source. The cylindrical lens 4 emanates the incoming light beam intact in the main scanning section. Also, the cylindrical lens 4 converges the incoming light beam in the sub-scanning section, and images it as a focal line image (a line image elongated in the main scanning direction) on a deflection surface 6a of the light deflector 6.

The light beam, which is reflected and deflected by the deflection surface of the light deflector 6, is imaged as a spot on the photosensitive drum surface 12 by the scanning lens 11, and when the light deflector 6 is rotated in the direction of the arrow A, that light beam optically scans the photosensitive drum surface 12 at an equal speed in a direction of an arrow 13 (main scanning direction). Thus, an image is recorded on the photosensitive drum surface 12 as a recording medium.

At this time, before optically scanning on the photosensitive drum surface 12, a timing of a scanning start position on the photosensitive drum surface 12 is decided. For this purpose, the light beam, which is reflected and deflected by the light deflector 6, is guided to a BD sensor 9 by a BD lens 8 via a BD mirror 7. Then, using a synchronization signal (BD signal) obtained by detecting an output signal from the BD sensor 9, scanning start timings of image recording of the light-emitting points 1 to 16 onto the photosensitive drum surface 12 are decided.

The BD lens 8 images the beam on the BD sensor 9 on the main scanning section, and sets the deflection surface of the light deflector 6 to be optically nearly conjugate with a sensor surface of the BD sensor 9 on the sub-scanning section, thus providing an inclination correction function (optical face tangle error correction system). Thus, even when the reflection surface of the light deflector 6 is inclined in the sub-scanning direction, a light beam hardly falls outside the sensor surface of the BD sensor 9.

Note that each of elements such as the BD mirror 7, BD lens 8, and BD sensor 9 configures one element of a synchronization position detection system (to be referred to as a BD detection system hereinafter).

FIG. 3 shows an optical axis 201 of the collimator lens 3, and a chief ray (a light ray which passes through the center of the aperture stop 5) 202 of a light beam coming from the LD1 as the light-emitting point. Also, FIG. 3 shows a light beam 203 coming from the LD16 as the light-emitting point. FIG. 3 shows an intersection 204 between the optical axis 201 of the collimator lens 3 and that of the f-θ lens 11, which intersection will be referred to as an on-axis deflection point hereinafter.

Furthermore, FIG. 3 shows an optical axis 205 of the f-θ lens 11, which is a straight line parallel to that of a light beam traveling toward an image center. Moreover, FIG. 3 shows a state 210 of the deflection surface which deflects a light beam traveling toward the image center, and a state 211 of the deflection surface which deflects a light beam traveling toward the center of the BD sensor 9. Also, in this embodiment, angles the LD1 and LD16 make with the optical axis 201 of the collimator lens 3 are 1 deg. The angles the LD1 and LD16 make with the optical axis 201 of the collimator lens 3 can be calculated by:

$$\vartheta = \tan^{-1}\left(\frac{Wm}{2f_{col}}\right)$$

where Wm is the width of the light-emitting point in the main scanning direction, and fcol is the focal length of the collimator lens 3.

Multi-Beam Light Source

As shown in FIG. 5, the light source 1 includes a plurality of light-emitting points (LD1 to LD16) which are arranged to have an interval in the main scanning direction and to be shifted in the sub-scanning direction. In FIG. 5, the abscissa indicates the main scanning direction of a reflection surface, and the ordinate indicates the sub-scanning direction of the reflection surface. In FIG. 5, the LD1 to LD16 are linearly arranged at an interval of 50 μm, and are arranged at equal intervals in both the main scanning direction and sub-scanning direction. Also, a laser is obliquely arranged according to a resolution in the sub-scanning direction, and a rotation angle about the optical axis can be changed to obtain a desired sub-scanning interval on the surface to be scanned according to variations of the incident optical unit and the scanning optical unit.

Also, a beam from the LD16 and that from the LD1 have different incident angles (angles the optical axis 201 of the collimator lens 3 makes with the optical axis 205 of the f-θ lens 11). Therefore, the beam from the LD1 is a scanning downstream beam, that is, a scanning front beam, and that from the LD16 is a scanning upstream (scanning rear) beam on the surface to be scanned 12. A write start timing is decided by a synchronization position detection signal of at least one of beams from the LD1 to LD16. In this embodiment, the write start timing is detected using only the beam from the LD16 as the scanning rearmost beam.

In FIG. 3, a light beam 200 traveling toward the BD mirror 7 is configured to travel toward the center of a BD slit at a scanning angle (an angle made with the optical axis 205 of the scanning lens) of 54 deg. in the state 211 of the deflection surface of the deflector 6 which is rotated in the direction of the arrow. Note that the stop 5 of this embodiment is located at a position separated by 22.5 mm from the on-axis deflection point 204 (the intersection between the optical axis 201 of the collimator lens and the optical axis 205 of the f-θ lens).

Table 1 to be described later shows design values of the light scanning apparatuses of this embodiment.

Collimator Lens

An exit surface of the collimator lens 3 of this embodiment is configured by a rotationally-symmetrical aspheric shape expressed by:

$$X = \frac{\frac{h^2}{R}}{1+\sqrt{1-(h/R)^2}} + Ah^2 + Bh^4 + Ch^6 + Dh^8 + Eh^{10} + Fh^{12} + Gh^{14}$$

$$h = \sqrt{Y^2 + Z^2}$$

Since the exit surface is defined by the aspheric shape, focal point position differences of multi-beams on the surface to be scanned are reduced, thus suppressing generation of spot size differences.

Cylindrical Lens

In this embodiment, a diffraction surface is formed on an incident surface of the cylindrical lens 4, thus suppressing spot size variations caused by environmental variations. A phase function is expressed by:

$$\Phi(y, z) = \frac{2\pi}{m\lambda}\{(E_1 y + E_2 y^3 + E_2 y^5 + \cdots + E_{10} y^{10}) + z^2(F_6 + F_2 y + F_3 y^3 + F_3 y^3 + \cdots + F_{10} y^{10})\}$$

Where m is an order of diffraction, and E1 to E10 and F0 to F10 are phase coefficients. Note that F0 to F10 are terms which express powers in the sub-scanning direction.

Scanning Optical System

Shapes of the first and second scanning lenses (f-θ lenses) 11a and 11b are expressed by the following functions. Assume that an intersection between each scanning lens and the optical axis is defined as an origin, and the optial axis is defined as an X axis, a direction perpendicular to the optical axis in a main scanning section is defined as Y axis, and a direction perpendicular to the optical axis in a sub-scanning section is defined as a Z axis on the scanning start side and scanning end side with respect to the optical axis. The function are respectively given by:

Scanning start side $$x = \frac{\frac{y^2}{R}}{1+\sqrt{1-(1+K)(y/R)^2}} + B_{4s}y^4 + B_{6s}y^6 + B_{8s}y^8 + B_{10s}y^{10} \quad (a)$$

Scanning end side $$x = \frac{\frac{y^2}{R}}{1+\sqrt{1-(1+K)(y/R)^2}} + B_{4e}y^4 + B_{6e}y^6 + B_{8e}y^8 + B_{10e}y^{10} \quad (b)$$

where R is a radius of curvature, and K, B4, B6, B8, and B10 are aspheric coefficients.

In this embodiment, the shape in the main scanning direction is configured to be symmetry with respect to the optical axis, that is, aspheric coefficients on the scanning start side and scanning end side are matched.

Also, in the sub-scanning direction, a curvature of one surface of the second scanning lens 11b in the sub-scanning section (a plane which includes the optical axis and is perpendicular to the main scanning section) is continuously changed in a lens effective part on the scanning start side and scanning end side with respect to the optical axis so as to configure the shapes in the main scanning direction and sub-scanning direction to be symmetry with respect to the optical axis. When the optical axis is defined as an X axis, a direction perpendicular to the optical axis in a main scanning section is defined as Y axis, and a direction perpendicular to the optical axis in a sub-scanning section is defined as a Z axis on the scanning start side and scanning end side with respect to the optical axis, the shape in the sub-scanning direction can be expressed by the following continuous functions.

Sub-scanning direction functions of r1, r2, and r4 surfaces $$S = \frac{\frac{z^2}{r'}}{1+\sqrt{1-(z/r')^2}} \quad r' = r(1+D_{2s}y^2+D_{4s}y^4+D_{6s}y^6+D_{8s}y^8+D_{10s}y^{10})$$

$$S = \frac{\frac{z^2}{r'}}{1+\sqrt{1-(z/r')^2}} \quad r' = 1/(1/r + D_{2e}y^2 + D_{4e}y^4 + D_{6e}y^6 + D_{8e}y^8 + D_{10e}y^{10})$$

(r' is a radius of curvature in the sub-scanning direction, and D2, D4, D6, D8, and D10 are coefficients) Suffix s of each coefficient expresses the scanning start side, and e expresses the scanning end side.

Note that the radius of curvature in the sub-scanning direcotion is that in a section perpendicular to the shape (generatix) in the main scanning direction.

$$S = \frac{\frac{z^2}{r'}}{1+\sqrt{1-(z/r')^2}} \quad r' = 1/(1/r + D_{2s}y^2 + D_{4s}y^4 + D_{6s}y^6 + D_{8s}y^8 + D_{10s}y^{10})$$

$$S = \frac{\frac{z^2}{r'}}{1+\sqrt{1-(z/r')^2}} \quad r' = 1/(1/r + D_{2e}y^2 + D_{4e}y^4 + D_{6e}y^6 + D_{8e}y^8 + D_{10e}y^{10})$$

(r' is a radius of curvature in the sub-scanning direction, and D2, D4, D6, D8, and D10 are coefficients) Suffix s of each coefficient expresses the scanning start side, and e expresses the scanning end side.

The scanning lens 11 of this embodiment achieves weight saving since the lenses 11a and 11b are configured by plastic lenses having light transmissive power, and can also improve degrees of freedom in design since aspheric surfaces are used. Note that the scanning lens 11 may be made of glass, or may be an optical element having diffraction power. When the scanning lens 11 is configured by a glass material or diffraction surface, a light scanning apparatus with excellent environmental characteristics can be provided.

Also, in this embodiment, the scanning lens is configured by two imaging optical elements. However, the present invention is not limited to this. For example, the scanning lens may be configured by one element or three or more elements, thus obtaining the same effects as in the above embodiment.

Table 1 shows respective numerical values of the light scanning apparatus of this embodiment. Note that "E-x" indicates "$10^{-x}$".

An R1 surface is that of the scanning lens 11a on the light deflector 6 side, an R2 surface is that of the scanning lens 11a on the surface to be scanned 12 side, an R3 surface is that of the scanning lens 11b on the light deflector 6 side, and an R4 surface is that of the scanning lens 11b on the surface to be scanned 12 side.

TABLE 1

| | |
|---|---|
| Used Wavelength (mm) | 6.70E−07 |
| Refractive index of imaging optical systems | 1.523972 |
| Number of surfaces of deflection unit | 5 |
| Diameter (mm) of circumscribed circle of deflection unit | 34 |
| Rotation angle (± deg.) of deflection unit | 24 |
| Incident angle (deg.) in main scanning direction | 70 |
| Incident angle (deg.) in sub-scanning direction | 0 |
| On-axis deflection point - incident surface of first imaging lens (mm) | 2.65E+01 |
| Focal length (mm) of imaging lens | 2.00E+02 |

| Coordinates of center of rotation of deflection unit | |
|---|---|
| X | −12.415 |
| Y | −6.247 |

| Incident optical system | | | |
|---|---|---|---|
| | r | d | N (670 nm) |
| Light source (light-emitting point) | 0.0000 | 18.7970 | 0.0000 |
| Sub-scanning stop | | 4.0000 | |
| Collimator lens *1 | 100.0000 | 3.9800 | 1.5796 |
| | −16.6211 | 75.4800 | 0.0000 |
| Cylindrical lens *2 | 0.0000 | 3.0000 | 1.5273 |
| | 7107.68 | 33.0000 | 1.0000 |
| Main scanning stop | | 22.5000 | |
| Deflection surface | 0.0000 | 0.0000 | 1.0000 |

| *1 Aspheric surface Aspheric coefficient | | *2 Phase function Phase coefficient | |
|---|---|---|---|
| A | 0.00E+00 | F0 | −9.10E−03 |
| B | 2.30E−05 | F1 | 0.00E+00 |
| C | 5.84E−08 | F2 | 0.00E+00 |
| D | 0.00E+00 | F3 | 0.00E+00 |
| E | 0.00E+00 | F4 | 0.00E+00 |
| F | 0.00E+00 | F5 | 0.00E+00 |
| G | 0.00E+00 | F6 | 0.00E+00 |

TABLE 1-continued

| | | Scanning optical system | | | | | | |
|---|---|---|---|---|---|---|---|---|
| | | R1 surface | | | | R2 surface | | |
| | | scanning start side (s) | | Scanning end side (e) | | Scanning start side (s) | | Scanning end side (e) |
| Main scanning section | d | 9.60E+00 | | | | d | 6.79E+01 | |
| | R | −7.12E+01 | | | | R | −4.16E+01 | |
| | K | 2.18E+00 | K | 2.18E+00 | | K | 6.43E−02 | K | 6.43E−02 |
| | B4 | 3.69E−6 | B4 | 3.69E−06 | | B4 | 2.78E−06 | B4 | 2.78E−06 |
| | B6 | 8.27E−11 | B6 | 8.27E−11 | | B6 | 1.18E−09 | B6 | 1.18E−09 |
| | B8 | 1.96E−13 | B8 | 1.96E−13 | | B8 | 2.10E−13 | B8 | 2.10E−13 |
| | B10 | 3.55E−17 | B10 | 3.55E−17 | | B10 | 2.07E−16 | B10 | 2.07E−16 |
| Sub-scanning section | r | −1.00E+03 | | | | r | −1.00E+03 | |
| | D2 | 0.00E+00 | D2 | 0.00E+00 | | D2 | 0.00E+00 | D2 | 0.00E+00 |
| | D4 | 0.00E+00 | D4 | 0.00E+00 | | D4 | 0.00E+00 | D4 | 0.00E+00 |
| | D6 | 0.00E+00 | D6 | 0.00E+00 | | D6 | 0.00E+00 | D6 | 0.00E+00 |
| | D8 | 0.00E+00 | D8 | 0.00E+00 | | D8 | 0.00E+00 | D8 | 0.00E+00 |
| | D10 | 0.00E+00 | D10 | 0.00E+00 | | D10 | 0.00E+00 | D10 | 0.00E+00 |
| | | R3 surface | | | | R4 surface | | |
| | | scanning start side (s) | | Scanning end side (e) | | Scanning start side (s) | | Scanning end side (e) |
| Main scanning section | d | 5.50E+00 | | | | d | 1.27E+02 | |
| | R | −8.24E+02 | | | | R | 7.68E+02 | |
| | K | 0.00E+00 | K | 0.00E+00 | | K | −5.90E+02 | K | −5.90E+02 |
| | B4 | 0.00E+00 | B4 | 0.00E+00 | | B4 | −2.57E−07 | B4 | −2.57E−07 |
| | B6 | 0.00E+00 | B6 | 0.00E+00 | | B6 | 2.17E−11 | B6 | 2.17E−11 |
| | B8 | 0.00E+00 | B8 | 0.00E+00 | | B8 | −1.48E−15 | B8 | −1.48E−15 |
| | B10 | 0.00E+00 | B10 | 0.00E+00 | | B10 | 4.78E−20 | B10 | 4.78E−20 |
| Sub-scanning section | r | −1.00E+03 | | | | r | −2.36E+01 | |
| | D2 | 0.00E+00 | D2 | 2.45E−06 | | D2 | 7.01E−05 | D2 | 1.25E−04 |
| | D4 | 0.00E+00 | D4 | −1.68E−10 | | D4 | −1.56E−08 | D4 | −1.53E−08 |
| | D6 | 0.00E+00 | D6 | 0.00E+00 | | D6 | 2.16E−12 | D6 | 2.83E−12 |
| | D8 | 0.00E+00 | D8 | 0.00E+00 | | D8 | −1.69E−16 | D8 | −3.04E−16 |
| | D10 | 0.00E+00 | D10 | 0.00E+00 | | D10 | 5.61E−21 | D10 | 1.06E−20 |

Focus Misregistration on Main Scanning Section and Print Misregistration in Main Scanning Direction FIG. 1A shows the relationship between focus misregistration in the main scanning section of the scanning lens 11 and print misregistration in the main scanning direction. FIG. 1A shows light-emitting points 1a and 1c, which are most spaced apart from each other of the light source unit 1 in the main scanning direction, and a light-emitting point 1b in the vicinity of the optical axis. Also, a light beam coming from the light-emitting point 1a is indicated by a broken like, and that coming from the light-emitting point 1c is indicated by a one-dashed chain line. The light source unit 1 is a surface-emitting laser having 16 light-emitting points, as shown in FIG. 5, LD1 as a light-emitting point in FIG. 5 corresponds to 1c in FIG. 1A, LD8 as a light-emitting point in FIG. 5 corresponds to 1b in FIG. 1A, and LD16 as a light-emitting point in FIG. 5 corresponds to 1a in FIG. 1A. Also, an interval between the LD8 and LD1 or LD16 along the main scanning direction is represented by W.

A chief ray of a light beam emitted from the light-emitting point 1b passes through the vicinity of the optical axis of the collimator lens 3, and then passes through the main scanning stop 5. Chief rays of light beams emitted from the light-emitting points 1a and 1b pass through off-axis positions of the collimator lens 3, cross each other at the main scanning stop 5, and then enter the deflector 6. Note that a distance between the main scanning stop 5 and the deflection surface of the deflector 6 in a state in which a light beam is deflected to an on-axis position of the scanning lens 11 is represented by L. The light beam deflected by the deflector 6 passes through the scanning lens 11, and is imaged on the surface to be scanned 12.

The reason why a print misregistration (partial magnification displacement) in the main scanning direction occurs when a focus misregistration of the scanning lens 11 in the main scanning section has occurred will be described below. FIG. 1A shows a case in which a focus position in the main scanning direction is curved like a curve 14 due to a manufacturing error of the scanning lens 11 (a case in which a main scanning curvature of field has occurred). As shown in FIG. 1A, the deflected light beam scans in a direction of an arrow 13, and a main scanning focus position matches the surface to be scanned in a range from a write start side 14a to a central portion 14b.

On the other hand, as shown in FIG. 1A, a main scanning image plane is curved in a plus direction in a range from the central portion 14b to a write end front side 14c, and is curved toward the minus side in a range from the write end front side 14c to a write end side 14d.

That is, as shown in FIG. 1A, a focal length of the scanning lens 11 is partially deviated from a design value, thus causing a defocus in the main scanning direction. In this case, when a plurality of beams are overlaid in a beam scanning direction, as shown in FIG. 1B, an interval between the beams 1c″ and 1a″ on the surface to be scanned 12 is broader than an original interval (that between the beams 1c′ and 1a′) in a state in which a focus position is deviated toward the plus side (write end front side 14c). On the other hand, the interval between the beams 1c″ and 1a″ is narrower than the original interval (that between the beams 1c′ and 1a′) in a state in which a focus position is deviated toward the minus side (write end side 14d).

In consideration of a single beam, a difference between formation positions of two neighboring spots of a plurality of spots in one array is different from that between formation position of other two neighboring spots in that array. That is, when the deflection unit deflects a single beam along the main scanning direction, a spot array (a plurality of spots) is formed on the surface to be scanned along the main scanning direction (in a shape approximate to a straight line), but a focal length of the scanning lens is partially deviated from a design value. Then, intervals in the main scanning direction between two neighboring spots are deviated.

As described above, in a case free from any curvature of field, light beams from the light-emitting point pass through the same position in the main scanning direction at predetermined time intervals in turn from the light-emitting point 1c in an order of the light-emitting points 1b and 1a. On the other hand, when a defocus (curvature of field) in the main scanning direction has occurred, an interval between the light-emitting points 1a and 1c in the main scanning direction is unwantedly deviated from a desired value according to the defocus amount and direction in the main scanning direction.

Figure 6A:
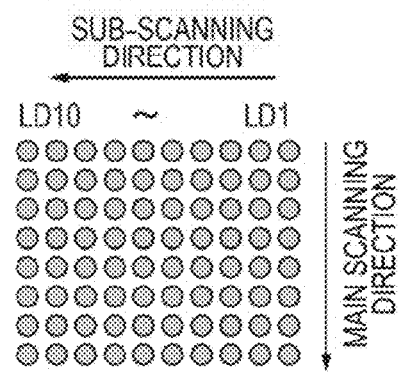
FIG. 6A is a schematic view showing dot positions in an image region of a surface to be scanned free from any defocus in the main scanning direction.
Figure 6B:
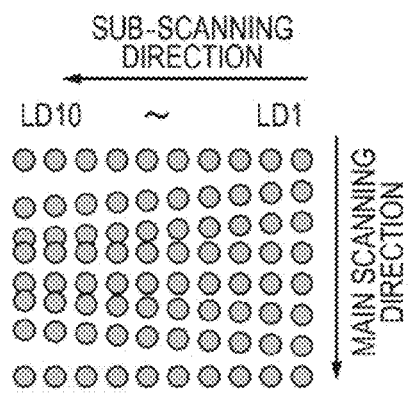
FIG. 6B is a schematic view showing dot positions in the image region of the surface to be scanned when a defocus in the main scanning direction is generated.

FIGS. 6A and 6B are views of dot positions in the surface to be scanned when laser emission control is executed at given intervals. In FIGS. 6A and 6B, a right-and-left direction is the sub-scanning direction, and an up-and-down direction is the main scanning direction. As shown in FIG. 6A, when no defocus in the main scanning direction occurs, the LD1 to LD10 (LD11 to LD16 are not shown) form dots at equal intervals in the main scanning direction. On the other hand, when a curvature of field in the main scanning direction occurs, the LD1 to LD10 (LD11 to LD16 are not shown) do not form dots at equal intervals in the main scanning direction.

FIG. 6B shows dot positions when the focus position in the main scanning direction is deviated from a design nominal position (when a curvature of field occurs). When a curvature of field (defocus) occurs, a defocus occurs, and dots are formed at positions (image height) deviated from dot positions to be originally formed (FIG. 6A), as shown in FIG. 6B. This deviation in the main scanning direction causes a color misregistration when a plurality of colors are overlaid. Since such deviation is repeated in the sub-scanning direction at beam cycles (16 beams in this embodiment), moiré is generated, thus deteriorating image quality.

The light scanning apparatus according to the present invention includes: a deflection unit configured to deflect a first beam and a second beam from a light source unit, which includes a first light-emitting point which intermittently emits the first beam and a second light-emitting point which intermittently emits the second beam, along a main scanning direction; and an imaging optical system configured to focus the first beam and the second beam emitted from the deflection unit on a surface to be scanned so as to form a plurality of spots using the first beam and a plurality of spots using the second beam, wherein letting a first spot and a second spot be two neighboring spots of the plurality of spots formed by the first beam, and a third spot and a fourth spot be two spots of the plurality of spots formed by the second beam having the same positions as the first spot and the second spot in the main scanning direction, a time difference when the first light-emitting point emits the beam so as to form the first spot and the second spot and a time difference when the second light-emitting point emits the beam so as to form the third spot and the fourth spot are different from each other.

The two neighboring spots are two spots which are successively formed by the beam intermittently emitted by the single light-emitting point on a scan line (surface to be scanned) drawn to be parallel to the main scanning direction by the beam emitted from that light-emitting point. These two spots are two neighboring spots of a plurality of spots formed when the single light-emitting point emits a beam at different timings. These two spots need only have their centers at different positions even when they (outer shapes of the spots) overlap each other. That is, these two spots may be those having neighboring spot center positions of a plurality of spots having different spot center positions.

The two spots located at the same position in the main scanning direction (a combination of the first and third spots or the second and fourth spots) need not always have completely the same position, and may be spots which "have nearly the same position in the main scan direction" or "have closest positions in the main scanning direction" or "overlap in the sub-scanning direction (when viewed from the sub scanning direction)".

Figure 6C:
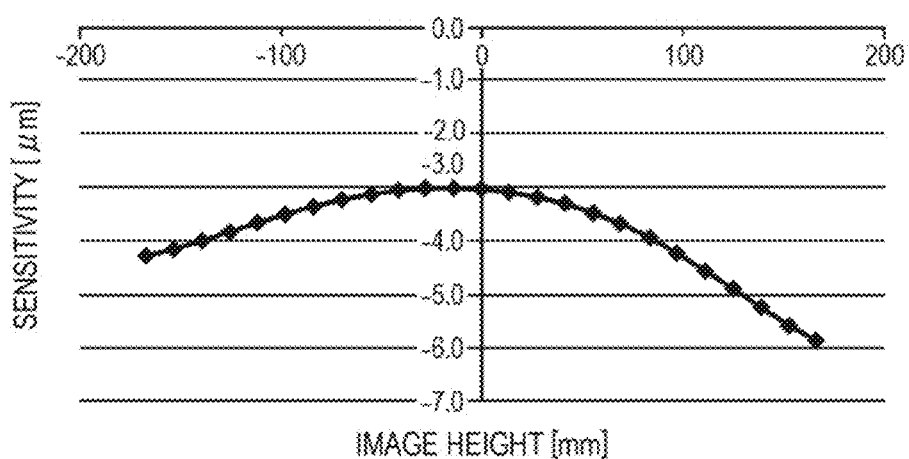
FIG. 6C is a graph showing dot deviations (sensitivities) of a light-emitting point 16 with respect to a light-emitting point 1, which are generated by a defocus of 1 mm in the main scanning direction.

FIG. 6C shows dot deviations of the LD16 with respect to the LD1 which are generated by a defocus of 1 mm, that is, sensitivities. In FIG. 6C, the abscissa plots a position (image height) in the main scanning direction on the surface to be scanned, and the ordinate plots the sensitivity. In FIG. 6C, a plus side of the image height (abscissa) indicates a write start side, a minus side indicates a write end side, and a minus side of the dot deviation (ordinate) indicates an increase in main scanning interval between the LD1 and LD16. Also, the reason why the sensitivity on the plus side (write start side) is higher than that on the write end side is that a displacement (sag) amount of the deflection surface of the deflector 6 in the optical axis direction of the scanning lens 11 is larger than that on the plus side (write start side).

Measurement of Emission Timing Errors of All Beams Upon Assembling/Delivery

1) Measurement System

In this embodiment, emission timing errors of all beams are measured by a plurality of sensors shown in FIG. 1C upon assembling/delivery of a scanning optical system, so as to reduce a dot deviation amount even when the scanning lens 11 which suffers a curvature of field (defocus) in the main scanning direction is used. In FIG. 1C, a light amount detection system including a slit 100a as a knife edge or the like, and a photodetector 100b or the like is arranged at each position equivalent to the surface to be scanned (drum surface), so as to detect a scanning beam.

2) Description of Sequence

FIG. 7 is a flowchart related to measurements upon assembling/delivery in this embodiment. A beam from the LD16 is detected by the BD sensor 9. Then, with reference to the obtained BD timing, all beams are detected by the photodetector 100b via the slit 100a shown in FIG. 1C. Thus, timings T0(LD1), T0(LD2), . . . , T0(LD16) when beams 1 to 16 pass through the slit 100a with respect to the BD signal of a beam 16 are measured.

Next, with reference to the above BD timing, all beams are detected by a photodetector 101b via a slit 101a. Thus, timings T1(LD1), T1(LD2), . . . , T1(LD16) when the beams 1 to 16 pass through the slit 101a with respect to the BD signal of the beam 16 are measured. Likewise, with reference to the above BD timing, all beams are detected by a photodetector 102b via a slit 102a. Thus, timings when the beams 1 to 16 pass through the slit 102a with respect to the BD signal of the beam 16 are measured.

Furthermore, with reference to the above BD timing, all beams are detected by a photodetector 103b via a slit 103a. Thus, timings when the beams 1 to 16 pass through the slit 103a with respect to the BD signal of the beam 16 are measured. Likewise, with reference to the above BD timing, all beams are detected by a photodetector 104b via a slit 104a.

Thus, timings when the beams 1 to 16 pass through the slit 104a with respect to the BD signal of the beam 16 are measured.

When measurements of all beams are not complete, the process returns to detection using the BD sensor 9 based on the beam from the LD16. Upon completion of measurements of all the beams, a beam deviation minimization calculation unit 250 (FIG. 1C) executes functional approximation for respective beams based on the 80 measured values T0(LD1) to T4(LD16). Then, emission timings in the main scanning direction (main scanning direction interval correction data) which can minimize beam interval deviations over the entire image regions of all the beams are calculated.

The calculated emission timings (main scanning direction interval correction data) of the respective beams are stored in a correction data storage unit 300 as a memory for each of first and second blocks (32 blocks in this embodiment) as a plurality of blocks divided in the main scanning direction. The measurements upon assembling/delivery are complete.

Correction by Emission Timing Control

After delivery, an emission control unit 400 controls emissions of all the beams at emission timings based on the correction data for the plurality of blocks, which are stored in the correction data storage unit 300. More specifically, assume that a difference between emission timings when two neighboring spots of a plurality of spots in one array are formed is different from that between emission timings when other two neighboring spots in that array are formed.

That is, when the deflection unit deflects a single beam in the main scanning direction, a spot array (a plurality of spots) is formed on the surface to be scanned along the main scanning direction (in a shape approximate to a straight line). When a focal length of the scanning lens 11 is partially deviated from a design value, different emission timings differences are set.

Numeric Value Example

In this embodiment, assume that a resolution R=2400 dpi in the main scanning direction, a distance L=22.5 mm from the main scanning stop to the deflection surface, a main scanning interval W=0.74 mm between the light emitting points, a main scanning focal length ffΘ=200.0 mm of an fΘ optical system, and a main scanning focal length fcol=25 mm of an incident optical system. With these values, we have:

$$\frac{LW}{f_{f\Theta} f_{col}} = \frac{22.5 \times 0.74}{200.0 \times 25} = 0.0033$$

This satisfies a conditional formula given by:

$$\frac{\frac{25.4}{R}}{20} < \frac{LW}{f_{f\Theta} f_{col}} < 2 \times \frac{25.4}{R}$$

Figure 4:
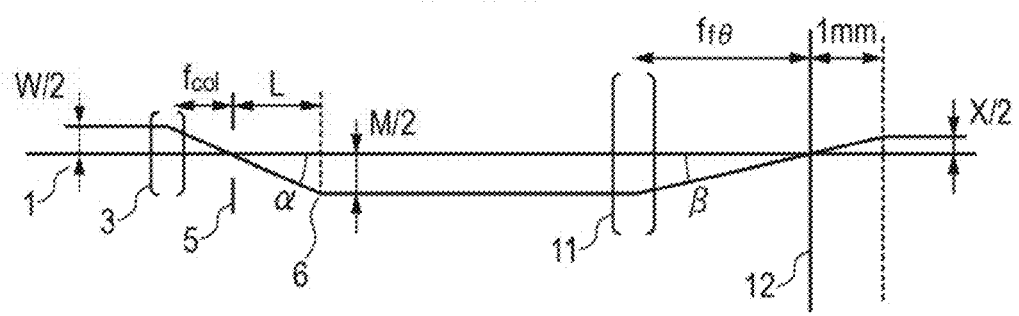
FIG. 4 is an optical path expansion view of the light scanning apparatus according to the first embodiment of the present invention.

This conditional formula specifies a dot deviation amount range on the axis when a focus position is deviated by 1 mm in the main scanning direction. In association with FIG. 4 which shows an optical path expansion view, the following equations hold:

$W/2 = f_{col} \times \tan\alpha$ $M/2 = L \times \tan\alpha$ $M/2 = f_{f\Theta} \times \tan\beta$ $X/2 = 1 \times \tan\beta$ Then, $X = L \times W / (f_{col} \times f_{f\Theta})$. In this case, in general, in an image forming apparatus having the resolution R=2400 dpi in the main scanning direction, an error has to be suppressed to ¹/₁₀ to 2 pixels in case of a defocus of 1 mm. As is understood from the above description, since 1 inch=25.4 mm, the aforementioned conditional formula has to be satisfied.

When an upper limit of the above conditional formula is exceeded, dot deviations in case of a defocus of 1 mm unwantedly deteriorate an image as moiré. When a lower limit is exceeded, a laser having a narrow light-emitting point interval in the main scanning direction has to be used, resulting in an increase in cost. Also, a high-output laser has to be used, resulting in an increase in cost.

As described above, emission timings of all the 16 beams are measured at five positions in the main scanning direction, and the emission timings of the respective beams are calculated to minimize a main scanning print misregistration. Then, a scanning region is divided into 32 regions, and the emission timings of respective light sources are corrected for respective regions, thus providing an inexpensive, high-resolution light scanning apparatus. When the light scanning apparatus is used in a color image forming apparatus, a high-resolution color image forming apparatus free from any color misregistration can be provided.

Second Embodiment

A difference between this embodiment and the first embodiment lies in a calculation method of emission timings of respective beams, and other components are the same as those of the first embodiment. FIG. 8 shows the correction value calculation sequence of this embodiment.

In this embodiment, a time difference ΔT0(1-2) from when a beam 1 passes through a slit 100a until a beam 2 passes through the slit 100a is measured. Likewise, a time difference ΔT0(2-3) from when the beam 2 passes through the slit 100a until a beam 3 passes through the slit 100a is measured. Also, time differences ΔT0(3-4), ΔT0(4-5), . . . , ΔT0(15-16) are measured. Likewise, time differences ΔTl(1-2), ΔT1(2-3), . . . , ΔT1(15-16) when these beams pass through a slit 101a are measured.

For slits 102a, 103a, and 104a, time differences ΔT2(1-2), ΔT2(2-3), . . . , ΔT2(15-16), ΔT3(1-2), ΔT3(2-3), . . . , ΔT3(15-16), ΔT4(1-2), ΔT4(2-3) , . . . , ΔT4(15-16) are similarly measured. Then, the 80 measured values ΔT0(1-2) to ΔT4(15-16) undergo functional approximation for respective inter-beam differences (ΔT0(1-2), ΔT1(1-2), ΔT2(1-2), ΔT3(1-2), and ΔT4(1-2)).

From time errors between the beams, which are calculated by the functional approximation, emission timings in the main scanning direction (main scanning direction interval correction data)=the errors with the reversed sign are calculated to minimize the beam interval deviation. The calculated emission timings (main scanning direction interval correction data) for the respective beams are written in a memory (net shown) for respective blocks (32 blocks in this embodiment), so as to correct write start positions of all the beams in the entire image region to nearly match. Note that a write start timing (BD timing) of this embodiment is decided by separately measuring a timing T2(LD16) when only a beam 16 passes through the slit 102a with respect to a BD signal of the beam 16.

When the correction values are calculated by the method of this embodiment, timings can be calculated without using any BD signal as an electric trigger signal, that is, correction data can be calculated from data of a single deflection surface of a light deflector 6 unlike in the first embodiment, thus improving the correction precision.

As described above, emission timing differences of all 16 beams are measured at five positions in the main scanning direction, and the emission timings of the respective beams are calculated to minimize a main scanning print misregistration, thereby calculating correction values from error data measured on the single deflection surface. Also, a scanning region is divided into 32 regions, and the emission timings of respective light sources are corrected for respective regions, thus providing an inexpensive, high-resolution light scanning apparatus. When the light scanning apparatus is used in a color image forming apparatus, a high-resolution color image forming apparatus free from any color misregistration can be provided.

Third Embodiment

A difference from the second embodiment lies in that different correction values are used for respective surfaces in this embodiment. Other components are the same as those of the second embodiment. FIG. 9 shows the correction value calculation sequence of this embodiment.

In this embodiment, write start position correction values for beams as many as the number of surfaces (five surfaces) of a polygon mirror of a light deflector 6 are measured. As in the second embodiment, correction values are measured as follows using tools upon factory delivery, and are written in a memory, thus allowing correction of beam emission timings.

In this embodiment, polygon mirror surfaces as deflection surfaces are specified by measuring BD cycles. That is, the surface is specified by measuring an angle division error generated upon manufacture of the polygon mirror as a change in BD timing. After the surfaces have been specified, time differences are measured for the respective surfaces as in the second embodiment. That is, a time difference $\Delta T0(1\text{-}2)$-surface A from when a beam 1 passes through a slit 100$a$ until a beam 2 passes through the slit 100$a$ is measured.

Likewise, a time difference $\Delta T0(2\text{-}3)$-surface A from when the beam 2 passes through the slit 100$a$ until a beam 3 passes through the slit 100$a$ is measured. Also, time differences $\Delta T0(3\text{-}4)$-surface A, $\Delta T0(4\text{-}5)$-surface A, . . . , $\Delta T0(15\text{-}16)$-surface A are measured. Likewise, time differences $\Delta T1(1\text{-}2)$-surface A, $\Delta T1(2\text{-}3)$-surface A, . . . , $\Delta T1(15\text{-}16)$-surface A when the beams pass through a slit 101$a$ are measured.

For slits 102$a$ and 103$a$, time differences $\Delta T2(1\text{-}2)$-surface A, $\Delta T2(2\text{-}3)$-surface A, . . . , $\Delta T2(15\text{-}16)$-surface A, $\Delta T3(1\text{-}2)$-surface A, $\Delta T3(2\text{-}3)$-surface A, . . . , $\Delta T3(15\text{-}16)$-surface A are similarly measured. Furthermore, for a slit 104$a$, time differences $\Delta T4(1\text{-}2)$-surface A, $\Delta T4(2\text{-}3)$-surface A, . . . , $\Delta T4(15\text{-}16)$-surface A are measured. Then, similar measurements are made for the next polygon mirror surface. That is, the measurements for five surfaces (surfaces A, B, C, D, and E) are made.

The 400 measured values $\Delta T0(1\text{-}2)$-surface A to $\Delta T4(15\text{-}16)$-surface E undergo functional approximation for respective surfaces and respective inter-beam differences ($\Delta T0(1\text{-}2)$-surface A, $\Delta T1(1\text{-}2)$-surface A, $\Delta T2(1\text{-}2)$-surface A, $\Delta T3(1\text{-}2)$-surface A, and $\Delta T4(1\text{-}2)$-surface A). From time errors between the beams, which are calculated by the functional approximation, emission timings in the main scanning direction (main scanning direction interval correction data)=the errors with the reversed sign are calculated to minimize the beam interval deviation.

The calculated emission timings (main scanning direction interval correction data) for the respective beams are written in a memory (not shown) for respective blocks (32 blocks in this embodiment), so as to match print positions of all the beams for respective surfaces in the entire image region in the sub-scanning direction. Note that a write start timing (BD timing) of this embodiment is decided by measuring, for each polygon mirror surface, a timing $T2(LD16)$ when only a beam 16 passes through the slit 102$a$ with respect to a BD signal of the beam 16. That is, the write start timing is changed for each surface ($T2(LD16)$-surface A to $T2(LD16)$-surface E).

When the correction values are calculated by the method of this embodiment, partial magnification errors for respective surfaces, which are generated due to manufacturing variations of the polygon mirror, can also be corrected, thus further improving the correction precision. In this embodiment, time differences between beams are measured for respective polygon surfaces as in the second embodiment. However, time differences may be measured for respective surfaces with reference to a BD timing as in the first embodiment. Also, five measurement sensors are used. However, in order to further improve the precision, six or more sensors may be used. Furthermore, correction data are stored by dividing into 32 blocks in the main scanning direction. Alternatively, the number of divisions may be 64, thus further improving the precision.

As described above, emission timing differences of all 16 beams are measured for each polygon surface at five positions in the main scanning direction, and the emission timings of the respective beams are calculated to minimize a main scanning print misregistration. Thus, inter-beam partial magnification errors generated due to manufacturing errors of the polygonal mirror can also be corrected, thus providing a high-resolution light scanning apparatus even when an inexpensive polygon mirror is used. When the light scanning apparatus is used in a color image forming apparatus, a high-resolution color image forming apparatus free from any color misregistration can be provided.

Fourth Embodiment

A difference between this embodiment and the third embodiment lies in that in place of storing correction values for respective surfaces and respective beams, identical correction values are stored for neighboring beams. Thus, the memory capacity can be reduced, and a high-resolution light scanning apparatus which requires lower cost can be provided. Other components of this embodiment are the same as those in the third embodiment.

In this embodiment, write start position correction values of odd beams as many as the number of surfaces (five surfaces) of a polygon mirror are measured. As in the second embodiment, correction values are measured as follows using tools upon factory delivery, and are written in a memory, thus allowing correction of beam emission timings.

That is, in this embodiment, polygon mirror surfaces are specified by measuring BD cycles. That is, the surface is specified by measuring an angle division error generated upon manufacture of the polygon mirror as a change in BD timing. After the surfaces have been specified, time differences are measured for the respective surfaces as in the second embodiment. That is, a time difference $\Delta T0(1\text{-}3)$-surface A from when a beam 1 passes through a slit 100$a$ until a beam 2 passes through the slit 100$a$ is measured. Likewise, a time difference $\Delta T0(3\text{-}5)$-surface A from when the beam 3 passes through the slit 100$a$ until a beam 5 passes through the slit 100$a$ is measured.

Also, time differences $\Delta T0(5\text{-}7)$-surface A, $\Delta T0(7\text{-}9)$-surface A, . . . , $\Delta T0(13\text{-}15)$-surface A are measured. Likewise, time differences $\Delta T1(1\text{-}3)$-surface A, $\Delta T1(3\text{-}5)$-surface A, . . . , $\Delta T1(13\text{-}15)$-surface A when the beams pass through a slit 101$a$ are measured. For slits 102$a$ and 103$a$, time differences ΔT2(1-3)-surface A, ΔT2(3-5)-surface A, ..., ΔT2(13-15)-surface A, ΔT3(1-3)-surface A, ΔT3(3-5)-surface A, ..., ΔT3(13-15)-surface A are similarly measured. Furthermore, for a slit 104a, time differences ΔT4(1-3)-surface A, ΔT4(3-5)-surface A, ..., ΔT4(13-15)-surface A are measured.

Then, similar measurements are made for the next polygon mirror surface. That is, the measurements for five surfaces (surfaces A, B, C, D, and E) are made. The 200 measured values ΔT0(1-3)-surface A to ΔT4(13-15)-surface E undergo functional approximation for respective surfaces and respective inter-odd beam differences (ΔT0(1-3)-surface A, ΔT1(1-3)-surface A, ΔT2(1-3)-surface A, ΔT3(1-3)-surface A, and ΔT4(1-3)-surface A). From time errors between the beams, which are calculated by the functional approximation, emission timings in the main scanning direction (main scanning direction interval correction data)=the errors with the reversed sign are calculated to minimize the beam interval deviation.

The calculated emission timings (main scanning direction interval correction data) for the respective beams are written in a memory (not shown) for respective blocks (32 blocks in this embodiment), so as to match main scanning print positions of all the beams for respective surfaces in the entire image region in the sub-scanning direction. Print timings of even beams can be decided by adding neighboring emission timing errors to the emission timings calculated from design beam intervals. Alternatively, emission timings may be decided using average values of neighboring odd beams.

Note that a write start timing (BD timing) of this embodiment is decided by measuring, for each polygon mirror surface, a timing T2(LD16) when only a beam 16 passes through the slit 102a with respect to a BD signal of the beam 16. That is, the write start timing is changed for each surface (T2(LD16)-surface A to T2(LD16)-surface E).

In this embodiment, the correction values are calculated by measuring odd beams. Alternatively, LD1 and LD16 (light-emitting points at two ends) may be measured, and correction values of other beams may be calculated by dividing correction amounts by (the number of beams −1).

When the correction values are calculated by the method of this embodiment, since the data size to be stored is small, an inexpensive memory can be used. Since the number of beams to be measured is small, a manufacturing takt time can be shortened.

As described above, emission timing differences of odd beams are measured for each polygon surface at five positions in the main scanning direction, and the emission timings of the respective beams are calculated to minimize a main scanning print misregistration. Thus, not only the measurement data size can be reduced to reduce a manufacturing cost, but also a high-resolution light scanning apparatus can be provided even when an inexpensive memory is used. When the light scanning apparatus is used in a color image forming apparatus, a high-resolution color image forming apparatus free from any color misregistration can be provided.

Modification 1

The aforementioned embodiments have explained the light scanning apparatus which uses the multi-beam system including a plurality of light sources (light-emitting points) in the sub-scanning direction and in which correction amounts are changed according to scan lines. That is, the aforementioned embodiments are premised on a difference between emission timings of a beam for neighboring first and second spots of a plurality of spots formed by a first beam. Then, this difference is different from a difference between emission timings of a beam by the light source unit for neighboring third and fourth spots, which have the same positions in the main scanning direction as the first and second spot, of a plurality of spots formed by a second beam.

However, the present invention is not limited to such multi-beam type light scanning apparatus but it is also applicable to a single-beam type light scanning apparatus including a single light source (light-emitting point). That is, upon scanning a single beam, a spot array (a plurality of spots) are formed on a surface to be scanned along the main scanning direction. When the focal length of the scanning lens 11 is partially deviated from a design value, different emission timing differences upon forming two neighboring spots are used.

That is, using the aforementioned method, correction based on the emission timing control is made depending on whether or not a focus position is on the front side (light source side) of the surface to be scanned, and the angle distribution of light beams focused at the focus position when viewed in the main scanning section. With this arrangement, even when the positional relationship (in an optical axis direction or a light traveling direction) between the focus position (smallest beam waist position or focusing position) and the surface to be scanned is different depending on a position in the main scanning direction, a scan line in which spot pitches are nearly uniform can be formed.

Note that as for decision of emission timings, measurement data are stored in advance, and the emission timings are decided based on the measurement data. In addition, the emission timings may be calculated.

Modification 2

In the aforementioned embodiments, different emission timings are used in each block. Alternatively, the same emission timing may be used in each block, and different emission timings may be used in different blocks.

Modification 3

In the aforementioned embodiments, the image region is divided into four zones at equal intervals, and timings which can minimize a beam interval deviation are calculated with reference to the BD timing of the LD16. However, in order to attain correction with higher precision, the number of divided zones may be increased. Also, as shown in FIG. 6C, since the dot deviation sensitivity is higher on the write start side, the number of sensors on the write start side may be increased. Furthermore, in this embodiment, the BD timing of the LD16 free from any beam vignetting amount by the deflection surface of the deflector 6 is used as a reference. Alternatively, a BD timing of another beam free from any vignetting amount by the deflection surface of the deflector 6 may be used as a reference.

Modification 4

All light-emitting points may be grouped into two or more groups depending on the positions in the main scanning direction, and different correction data may be used for respective groups.

Modification 5

In the aforementioned embodiments, light emission itself by the light source unit (light-emitting point) is intermittently made so as to intermittently emit a beam. Alternatively, a light-shielding member such as a shutter may be arranged immediately after the light source unit, and a light-shielding operation by this light-shielding member may be intermittently made. Note that the number of beams (the number of light-emitting points) is not particularly limited as long as at least three beams are used.

According to the present invention, a light scanning apparatus with a simple arrangement, which can reduce print misregistration of respective beams in the main scanning direction in the image region even when an inexpensive imaging optical unit which forms spot images on the image region of the surface to be scanned is used, and can form a high-resolution image, and an image forming apparatus using the same can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-038626, filed Feb. 28, 2013, which is hereby incorporated by reference herein in its entirety.

What is claimed is:

1. A light scanning apparatus comprising:
a deflection unit configured to deflect a first beam and a second beam from a light source unit, which includes a first light-emitting point which intermittently emits the first beam and a second light-emitting point which intermittently emits the second beam, along a main scanning direction; and
an imaging optical system configured to focus the first beam and the second beam emitted from the deflection unit on a surface to be scanned so as to form a plurality of spots using the first beam and a plurality of spots using the second beam,
wherein letting a first spot and a second spot be two neighboring spots of the plurality of spots formed by the first beam, and a third spot and a fourth spot be two spots of the plurality of spots formed by the second beam having the same positions as the first spot and the second spot in the main scanning direction, a time difference when the first light-emitting point emits the beam so as to form the first spot and the second spot and a time difference when the second light-emitting point emits the beam so as to form the third spot and the fourth spot are different from each other.

2. An apparatus according to claim 1, wherein the plurality of spots formed on the surface to be scanned by the first beam emitted from the first light-emitting point includes a first block including a plurality of spots, and a second block which includes a plurality of spots and neighbors the first block,
in the first block, a time difference when the first light-emitting point emits the first beam so as to form two neighboring spots is the same in all of two neighboring spots,
in the second block, a time difference when the second light-emitting point emits the second beam so as to form two neighboring spots is the same in all of two neighboring spots, and
a time difference between a timing at which the first light-emitting point emits the first beam so as to form a spot closest to the second block of the plurality of spots in the first block and a timing at which a beam is emitted from the light source unit so as to form a spot closest to the first block of the plurality of spots in the second block is different from a time difference when the first light-emitting point emits the first beam so as to form two neighboring spots in the first block and a time difference when the first light-emitting point emits the first beam so as to form two neighboring spots in the second block.

3. An apparatus according to claim 1, wherein the plurality of spots formed by the first beam emitted from the first light-emitting point include a plurality of blocks which are arranged at neighboring positions along the main scanning direction, and each of which includes some spots of the plurality of spots, and
a difference between emission timings of the first light-emitting point to form two neighboring spots in a first block of the plurality of blocks is different from a difference between emission timings of the second light-emitting point to form two neighboring spots in the second block.

4. An apparatus according to claim 1, wherein the light source unit includes three light-emitting points which have different positions in both the main scanning direction and the sub-scanning direction and include the first light-emitting point and the second light-emitting point,
a plurality of spots formed on the surface to be scanned are configured to be divided, along the main scanning direction, into a plurality of blocks in which emission time intervals of the three light-emitting points become constant, and
the light scanning apparatus further comprises:
a data storage unit configured to store the emission time intervals of the three light-emitting points between the plurality of blocks and emission time intervals in each of the blocks; and
an emission control unit configured to control light emission of the three light-emitting points using the emission time intervals stored in the data storage unit.

5. An apparatus according to claim 1, further comprising:
an incident optical unit configured to form the beams from the first light-emitting point and the second light-emitting point on a deflection surface of the deflection unit or an adjacent position of the deflection surface as focal lines along the main scanning direction; and
a stop which is arranged in an optical path between the light source unit and the deflection unit and is configured to restrict a beam width in the main scanning direction,
wherein letting
L: a distance (mm) from the stop to the deflection surface, which regulates the beam width in the main scanning direction,
W: an interval (mm) of the light-emitting points in the main scanning direction,
$f_{f\Theta}$: a main scanning focal length (mm) of the imaging optical unit,
$f_{col}$: a main scanning focal length (mm) of the incident optical unit, and
R: a main scanning direction resolution (dpi: dot per inch),
a conditional formula given by:

$$\frac{\frac{25.4}{R}}{20} < \frac{LW}{f_{f\Theta} f_{col}} < 2 \times \frac{25.4}{R}$$

is satisfied.

6. An image forming apparatus comprising:
a deflection unit configured to deflect a first beam and a second beam from a light source unit, which includes a first light-emitting point which intermittently emits the first beam and a second light-emitting point which intermittently emits the second beam, along a main scanning direction;
an imaging optical system configured to focus the first beam and the second beam emitted from the deflection unit on a surface to be scanned so as to form a plurality of spots using the first beam and a plurality of spots using the second beam, wherein letting a first spot and a second spot be two neighboring spots of the plurality of spots formed by the first beam, and a third spot and a fourth spot be two spots of the plurality of spots formed by the second beam having the same positions as the first spot and the second spot in the main scanning direction, a time difference when the first light-emitting point emits the beam so as to form the first spot and the second spot and a time difference when the second light-emitting point emits the beam so as to form the third spot and the fourth spot are different from each other, a photosensitive body arranged on the surface to be scanned, a developing unit configured to develop an electrostatic latent image formed on the photosensitive body by a light beam scanned by the light scanning apparatus as a toner image, a transferring unit configured to transfer the developed toner image onto a transfer material, and a fixing unit configured to fix the transferred toner image onto the transfer material.

7. An image forming apparatus comprising:

a deflection unit configured to deflect a first beam and a second beam from a light source unit, which includes a first light-emitting point which intermittently emits the first beam and a second light-emitting point which intermittently emits the second beam, along a main scanning direction;

an imaging optical system configured to focus the first beam and the second beam emitted from the deflection unit on a surface to be scanned so as to form a plurality of spots using the first beam and a plurality of spots using the second beam, wherein letting a first spot and a second spot be two neighboring spots of the plurality of spots formed by the first beam, and a third spot and a fourth spot be two spots of the plurality of spots formed by the second beam having the same positions as the first spot and the second spot in the main scanning direction, a time difference when the first light-emitting point emits the beam so as to form the first spot and the second spot and a time difference when the second light-emitting point emits the beam so as to form the third spot and the fourth spot are different from each other, and a printer controller configured to convert code data input from an external apparatus into an image signal and to input the image signal to the light scanning apparatus.

* * * * *